Patented Nov. 4, 1930

1,780,836

UNITED STATES PATENT OFFICE

PAUL NAWIASKY AND ARTUR KRAUSE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

NEW VAT DYESTUFFS

No Drawing. Application filed March 23, 1928, Serial No. 264,274, and in Germany March 30, 1927.

The present invention relates to new vat dyestuffs and a process for producing the same.

We have found that valuable new condensation products are obtained by treating anthrapyrimidine, or its substitution products and derivatives with alkaline condensing agents. The new products are of technical importance as valuable vat dyestuffs and as intermediate products in the production of other dyestuffs. The aforesaid products may be purified if necessary, for example, by treatment with oxidizing agents, or by recrystallization or by fractional precipitation from their solutions in concentrated sulfuric acid.

The following examples will further illustrate how the said invention may be carried into practical effect but the invention is not limited thereto. The parts are by weight.

Example 1

10 parts of anthrapyrimidine of the formula:

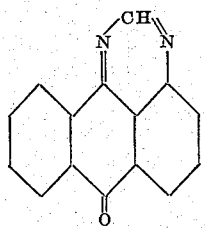

obtainable by the action of formamide on α-aminoanthraquinone, are introduced at 130° centigrade into a melt prepared by heating 100 parts of caustic potash and 100 parts of ethyl alcohol. The temperature is then raised to 140° centigrade and there maintained until the formation of the dyestuff is complete. The red-brown melt is poured into water, the leuco compound is oxidized with air, and the dyestuff is further treated in the usual manner. The yellow-brown product gives brown dyeings on cotton from a brown vat, the color changing on exposure to the air, to a yellow with greenish tinge, which is fast to chlorine and soap. The dyestuff may be purified, either before or after application to the fibre, by treatment with oxidizing agents as for example by heating with hypochlorite solution. It dissolves with great difficulty in organic solvents, and furnishes yellow-green needles on recrystallization from trichlorbenzene.

Example 2

10 parts of py-C-methylanthrapyrimidine of the formula:

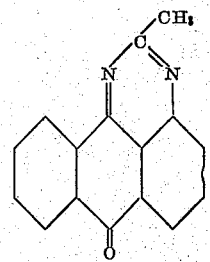

are introduced at 130° centigrade into a melt prepared by heating 100 parts of caustic potash and 100 parts of ethyl alcohol. The temperature is then raised to 140° centigrade until the formation of the dyestuff is complete, and the further treatment is carried on as described in Example 1. The dyestuff gives brown dyeings on cotton, from a vat of the same color. On exposure to the air, the color changes to very fast lemon-yellow. The dyestuff is very sparingly soluble in trichlorbenzene from which it crystallizes out in yellow-green needles. Purification may be effected for example by treatment with oxidizing agents as in Example 1.

What we claim is:

1. A process for the production of new condensation products, which consists in treating anthrapyrimidines with alkaline condensing agents.

2. A process for the production of new condensation products, which consists in treating anthrapyrimidines with alkaline condensing agents and purifying by treatment with an oxidizing agent.

3. The process for the production of a yellow vat dyestuff, which consists in treating anthrapyrimidine in an alcoholic caustic potash melt.

4. As new articles of manufacture, the vat dyestuffs which dye cotton brown shades from vats of the same color, the color of the dyeings changing to yellow with a greenish tinge on exposure to air, the dyestuffs being obtainable by treating anthrapyrimidines with alkaline condensing agents.

5. As a new article of manufacture the vat dyestuff, which dyes cotton brown from a vat of the same color, the color of the dyeing changing to yellow with a greenish tinge on exposure to air and which dyestuff is obtainable by treating anthrapyrimidine in the alcoholic caustic potash melt.

In testimony whereof we have hereunto set our hands.

PAUL NAWIASKY.
ARTUR KRAUSE.